Dec. 30, 1930.  E. MOREL  1,787,014
MAGNETO ELECTRIC MACHINE FOR THE GENERATION OF MONOPHASE CURRENT
Filed Nov. 7, 1928   3 Sheets-Sheet 1

INVENTOR.
Emile Morel.
By Cameron, Kerkam and Sutton.
Attorneys.

Dec. 30, 1930.  E. MOREL  1,787,014
MAGNETO ELECTRIC MACHINE FOR THE GENERATION OF MONOPHASE CURRENT
Filed Nov. 7, 1928   3 Sheets-Sheet 2

INVENTOR.
Emile Morel.
By Cameron, Kerkam and Sutton.
Attorneys.

Dec. 30, 1930.  E. MOREL  1,787,014
MAGNETO ELECTRIC MACHINE FOR THE GENERATION OF MONOPHASE CURRENT
Filed Nov. 7, 1928  3 Sheets-Sheet 3
*Fig. 4*
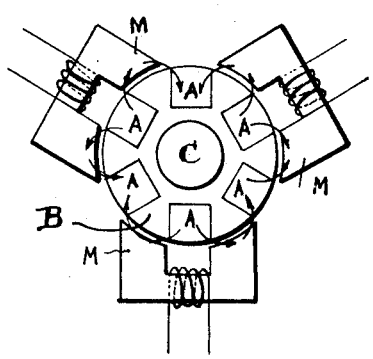
*Fig. 7*
*Fig. 6*
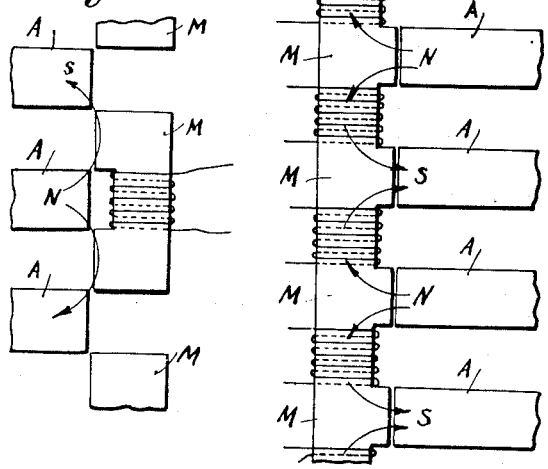
INVENTOR.
Emile Morel.
By Cameron, Kerkam and Sutton,
Attorneys.

Patented Dec. 30, 1930

1,787,014

UNITED STATES PATENT OFFICE

EMILE MOREL, OF DOMENE, FRANCE

MAGNETO-ELECTRIC MACHINE FOR THE GENERATION OF MONOPHASE CURRENT

Application filed November 7, 1928, Serial No. 317,830, and in France and Germany November 9, 1927.

The present invention relates to multipolar magneto-electric machines for generating an alternating electric current.

According to this invention a magneto-electric machine, comprises a rotating magnet which is formed of an even number of magnetic bars arranged longitudinally and symmetrically about the axis of rotation of the inductor, the neighbouring extremities of the bars being of different polarities. The said magnetic bars cooperate in pairs with electro-magnetic circuits arranged circularly in two groups facing the extremities of these magnets in such a manner as to periodically couple the magnetic bars in magnetic series across the electro-magnetic circuits for the position of maximum magnetic flux in these electro-magnetic circuits and passing from one pair of bars to the subsequent one.

The groups of the electro-magnetic circuits are either arranged face to face without dephasing with respect to one another in such a manner as to place the bars in series by pairs by their two extremities simultaneously, or they are dephased one with respect to the other by the interval comprised between the axis of two consecutive bars, with the aim of placing in series the whole of the bars in passing from one to the other. The groups may also according to another feature of the invention be dephased one with respect to the other by half the distance of two consecutive bars in such a manner as to double the number of current alternations per revolution.

The electro-magnetic circuits are formed of independent magnetic armatures, each of which carries a winding, or of a common and continuous magnetic armature provided with pole pieces and with windings located between said pole pieces or on the same.

The number of magnetic bars being even, the number of the alternations of the current will be 2, 4, 6, 8 or more for each revolution of the inductor device and in each electro-magnetic circuit.

The electric currents generated by the modification of the magnet field in each of the windings may be collected and utilized in any known manner.

The annexed drawing shows, by way of example, several manners of realizing the invention. In the said drawing, Fig. 1 is a diagrammatic perspective view of a six magnets magneto-electric machine according to the invention;

Fig. 4 is a similar view corresponding to a minimum of the magnetic field.

Figs. 5, 6 and 7 are similar views of modifications.

Figure 1:
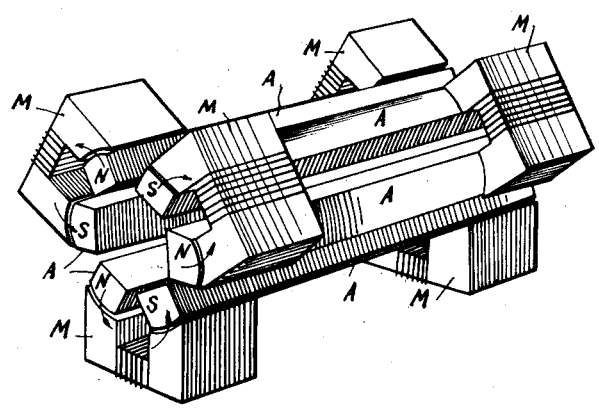
Figure 2:
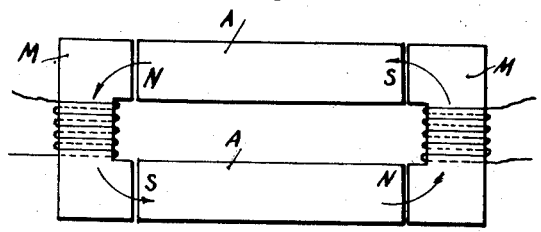
Fig. 2 shows a diagrammatic development of the said machine.
Figure 2:
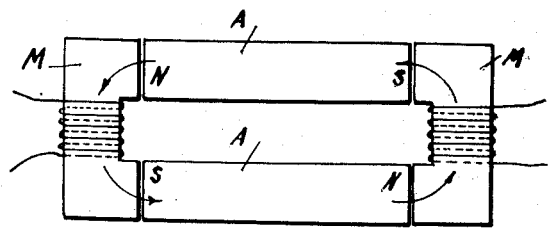
Figure 2:
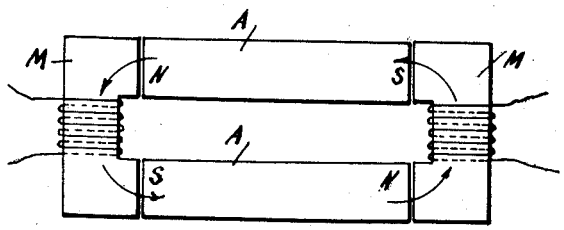

In Figs. 1 and 2, six magnet bars A are arranged according to the edges of a hexagonal prism; two series of pole pieces M (electro-magnetic circuits), made of soft iron or steel, are placed facing the extremities of the said magnet bars.

On a given position of the bars (Figs. 1 and 2) the magnetic flux passes through the bars and the pole pieces in the direction shown by arrows.

Figure 3:
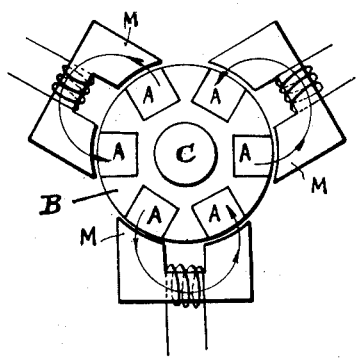
Fig. 3 is a cross section for such a position that the magnetic field shows a maximum in the electro-magnetic circuits.

The flux has its maximum in the electro-magnetic circuits when the magnet bars pass before the pole pieces (Fig. 3); it has its minimum when the magnet bars are positioned between the pole pieces of one and the same electro-magnetic circuit (Fig. 4); then it becomes again maximum but has a reverse direction in the pole pieces when the magnets are again facing the extremities of the magnet bars, and so on.

Figure 5:
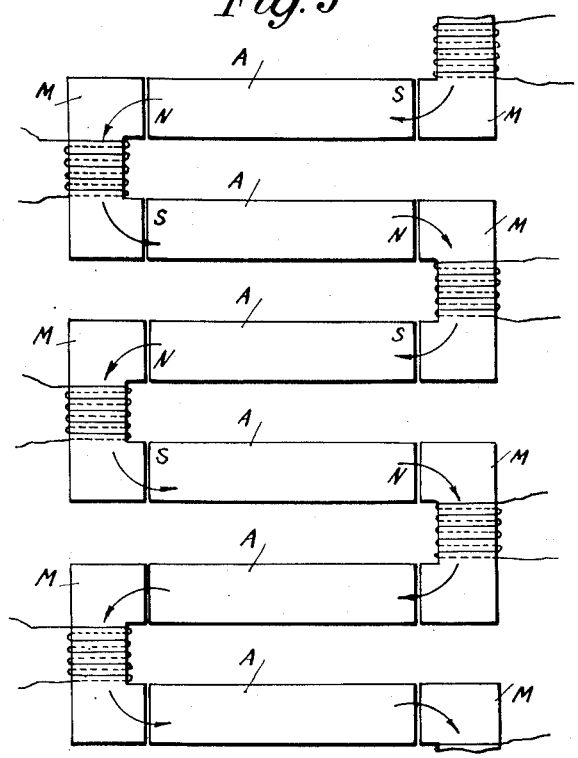

In the arrangement shown in Fig. 5, the active positions of the pole pieces of the electro-magnetic circuit are not identical as above indicated but they are dephased; a sole and unit magnetic flux is thus obtained and it passes simultaneously along all the magnet bars and passes simultaneously through all the electro-magnetic circuits, sometimes in one direction, sometimes in the reverse direction. The flux is annulled each time the magnet bars face the intervals comprised between the pole pieces M.

Fig. 6 shows a position for which the said flux is nul or minimum.

In the case of Fig. 7 the pole pieces located at the extremities of the inductor are all connected together and they comprise a closed ring provided with as many pole pieces as there are magnet bars. Each time the magnet bars pass in front of these pole pieces a series of fluxes pass alternatively and simultaneously in reverse direction in all the inductive windings located between the pole pieces as shown by arrows.

Any known means may be combined with the magnet bars and the electro-magnetic circuits as above described in order to collect and eventually to transform and to distribute for instance to spark plugs of internal combustion engines, the electric currents generated in the electro-magnetic circuits.

The magnet bars have been shown as fixed on a disc or discs B of nonmagnetic metal secured to an axial spindle C. They may of course be secured to a spindle by any other convenient means.

What I claim is:

1. A magneto-electric machine having a rotative inductor formed of an even number of magnetically separate permanent bar magnets arranged longitudinally and symmetrically about the axis of rotation of the inductor, the neighboring extremities of the bars at each end of the inductor being of different polarities, and electro-magnetic systems arranged circularly in two groups at each end of the inductor, each of said systems magnetically coupling the extremities of two adjacent magnets in such a manner as to couple the bar magnets in magnetic series across the electro-magnetic systems for the position of maximum flow of flux in said systems.

2. A magneto-electric machine, as claimed in claim 1, characterized by the fact that the groups of the electro-magnetic systems are arranged face to face without dephasing with respect to one another in such a manner as to place the bars in series by pairs by their two extremities simultaneously.

3. A magneto-electric machine as claimed in claim 1, characterized by the fact that each group of the electro-magnetic systems corresponding to each extremity of the magnetized bars is formed of independent magnetic armatures each carrying a winding.

4. A magneto-electric machine comprising a rotor having a plurality of separate bar magnets disposed around and parallel to the rotor axis with adjacent extremities of unlike polarity, and pole pieces at each end of said rotor, said pole pieces each having an angular extent sufficient to magnetically couple two adjacent extremities of said bars whereby a plurality of said bars are coupled in magnetic series by said pole pieces, said pole pieces carrying windings to be energized.

5. A magneto-electric machine comprising a rotor having separate parallel bar magnets disposed about the rotor axis with ends of unlike polarity adjacent one another, and pole pieces at opposite ends of said rotor, each of said pole pieces extending between two adjacent bars, whereby two of said bars and two of said pole pieces are adapted to constitute a substantially closed magnetic circuit with the bars coupled in magnetic series.

6. A magneto-electric machine as claimed in claim 1, characterized by the fact that the groups of electro-magnetic systems are dephased one with respect to the other by the interval comprised between the axes of two consecutive bars so as to place in series all of the bars.

7. A magneto-electric machine as claimed in claim 1, characterized by the fact that the groups of electro-magnetic systems are dephased one with respect to the other by half the distance between two consecutive bars, whereby the number of sparks per revolution is doubled.

In testimony whereof I have signed this specification.

EMILE MOREL.